(12) United States Patent
Kim et al.

(10) Patent No.: US 8,730,561 B2
(45) Date of Patent: May 20, 2014

(54) ELECTROPHORETIC DISPLAY DEVICE AND DRIVING METHOD THEREOF

(75) Inventors: Jae-Kyoung Kim, Yongin (KR); Min-Woo Kim, Yongin (KR); Il-Nam Kim, Yongin (KR); Soo-Min Baek, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 27 days.

(21) Appl. No.: 13/312,233

(22) Filed: Dec. 6, 2011

(65) Prior Publication Data

US 2013/0003164 A1    Jan. 3, 2013

(30) Foreign Application Priority Data

Jun. 30, 2011 (KR) .......................... 10-2011-0064220

(51) Int. Cl.
 *G02B 26/00* (2006.01)
(52) U.S. Cl.
 USPC ........................................................ 359/296
(58) Field of Classification Search
 USPC ................................ 359/296; 345/107, 83, 84
 See application file for complete search history.

(56) References Cited

U.S. PATENT DOCUMENTS

| | | | |
|---|---|---|---|
| 6,741,386 B2* | 5/2004 | Minami | 359/296 |
| 7,227,525 B2 | 6/2007 | Kishi | |
| 7,352,502 B2* | 4/2008 | Miyazaki et al. | 359/296 |
| 7,382,351 B2 | 6/2008 | Kishi | |
| 7,956,820 B2 | 6/2011 | Huitema et al. | |
| 8,154,790 B2* | 4/2012 | Wang et al. | 359/296 |
| 8,441,713 B2* | 5/2013 | Kawashima et al. | 359/296 |
| 2011/0255145 A1* | 10/2011 | Masuzawa et al. | 359/296 |
| 2012/0007897 A1* | 1/2012 | Yang et al. | 345/690 |

FOREIGN PATENT DOCUMENTS

| | | |
|---|---|---|
| JP | 2004-271610 | 9/2004 |
| JP | 2010-164659 | 7/2010 |
| KR | 10-2008-0015853 A | 2/2008 |
| KR | 10 2010 0045273 A | 5/2010 |

* cited by examiner

*Primary Examiner* — Tuyen Tra
(74) *Attorney, Agent, or Firm* — Lee & Morse, P.C.

(57) ABSTRACT

An electrophoretic display device includes a first display substrate (including a base substrate, a first electrode, and a second electrode), a second display substrate (including a third electrode facing the first and second electrodes), and an electrophoretic layer between the first display substrate and the second display substrate, the electrophoretic layer including a first charged particle, a second charged particle and a colored solvent (the first and second charged particles having different polarities from each other and the colored solvent having a chromatic color).

21 Claims, 5 Drawing Sheets

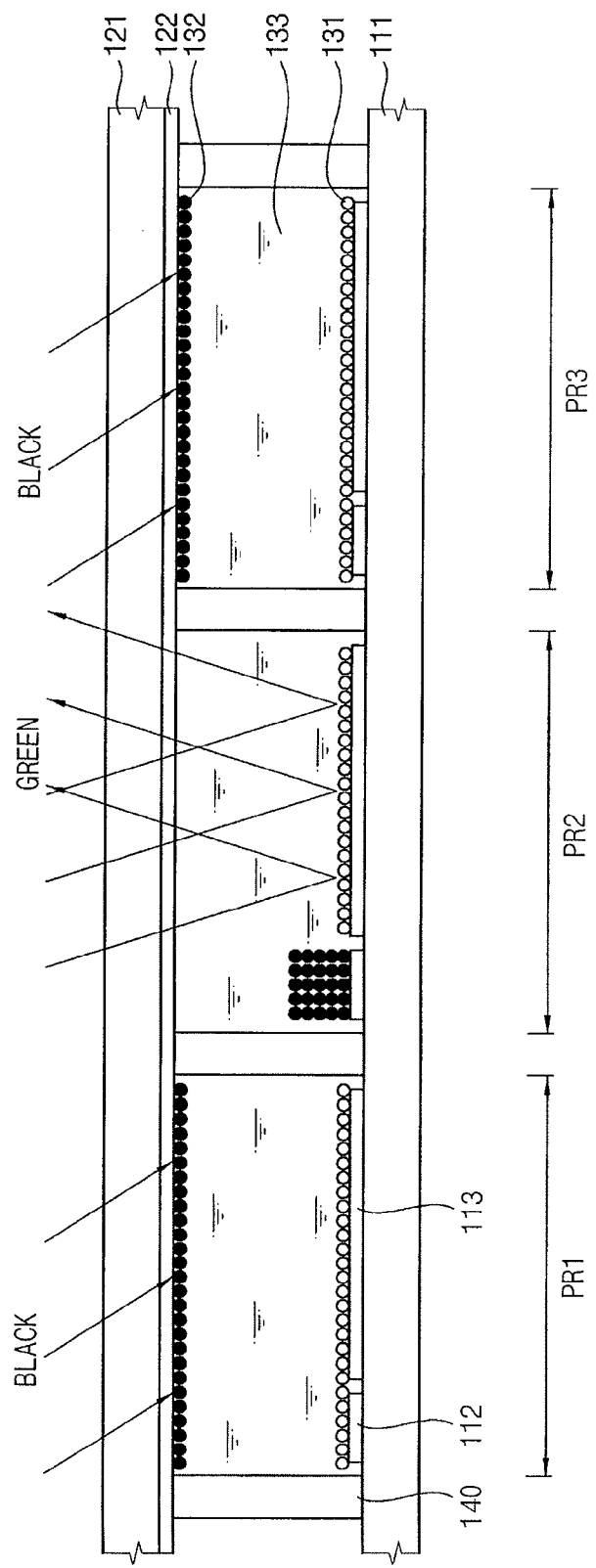

ELECTROPHORETIC DISPLAY DEVICE AND DRIVING METHOD THEREOF

CROSS REFERENCE TO RELATED APPLICATION

This application claims priority under 35 U.S.C. §119 to Korean patent Application No. 2011-00064220 filed on Jun. 30, 2011, the disclosure of which is hereby incorporated by reference herein in its entirety.

BACKGROUND

1. Technical Field

Example embodiments relate to an electrophoretic display device and a driving method thereof.

2. Description of the Related Art

An electrophoretic display (EPD) device is one of flat panel display devices, which is typically used for an electronic book (e-book), an electronic paper (e-paper), etc.

The EPD device may apply different voltages to two electrodes opposed to each other to display a text or an image by using an electrophoresis phenomenon in which a charged particle migrates toward an electrode having a polarity that is opposite to that of the charged particle. Since the EPD device is a reflection type display device that does not require a backlight unit, the EPD device may have low power consumption. Further, the EPD device may have improved contrast and wide viewing angle, and may provide high visibility.

Early EPD devices have been able to display only a black/white image. However, an EPD device for displaying a color image has recently been developed to display various contents.

SUMMARY

One or more embodiments may provide an electrophoretic display device including: a first display substrate including a base substrate, a first electrode and a second electrode, the first electrode and the second electrode being on the base substrate in a pixel region; a second display substrate including a third electrode facing the first and second electrodes; and an electrophoretic layer between the first display substrate and the second display substrate, the electrophoretic layer including a first charged particle, a second charged particle and a colored solvent, the first and second charged particles having different polarities from each other, the colored solvent having a chromatic color.

The electrophoretic display device may further include an isolation wall pattern disposed between the first display substrate and the second display substrate, the isolation wall pattern may define a boundary of the pixel region. The electrophoretic layer of the pixel region may be filled with the colored solvent.

In example embodiments, the first charged particle may have a black color, and the second charged particle may have a white color.

In example embodiments, a size of the first electrode may be smaller than a size of the second electrode. The size of the first electrode may be less than about 20% of a size of the pixel region.

In example embodiments, the electrophoretic display device may be configured to display a black color or a white color using a vertical electric field between the third electrode and the first and second electrodes, and may be configured to display a chromatic color using a horizontal electric field between the first electrode and the second electrode.

In example embodiments, the colored solvent of the electrophoretic layer may have one of a red color, a green color and a blue color.

In example embodiments, the colored solvent of the electrophoretic layer may have one of a cyan color, a magenta color and a yellow color.

In example embodiments, the colored solvent of the electrophoretic layer may include a dye or a pigment.

In example embodiments, the first display substrate may further include: a gate line extending in a first direction; first and second data lines extending in a second direction intersecting the first direction, the first and second data lines disposed in parallel, and the first and second electrodes disposed between the first data line and the second data line; a first switching element coupled to the gate line and the first data line, and configured to apply a pixel voltage on the first data line to the first electrode in response to a scan signal of the gate line; and a second switching element coupled to the gate line and the second data line, and configured to apply a pixel voltage on the second data line to the second electrode, in response to the scan signal of the gate line One or more embodiments may provide a method of driving an electrophoretic display device including: displaying a white color of a second charged particle by electrophoresing a first charged particle having a black color to first and second electrodes and the second charged particle having the white color to a third electrode facing the first and second electrodes, the first and second charged particles being dispersed in a colored solvent having a chromatic color, and the first and second charged particles having different polarities from each other; displaying the black color of the first charged particle by electrophoresing the first charged particle to the third electrode and the second charged particle to the first and second electrodes; displaying the chromatic color of the colored solvent by electrophoresing the first charged particle to the first electrode and the second charged particle to the second electrode.

In example embodiments, a size of the first electrode may be smaller than a size of the second electrode.

BRIEF DESCRIPTION OF THE DRAWINGS

Example embodiments can be understood in more detail from the following description taken in conjunction with the accompanying drawings, in which:

FIGS. 4A and 4B are cross-sectional views of an electrophoretic display device in various stages of a method of driving the electrophoretic display device to display a color image in accordance with example embodiments.

DETAILED DESCRIPTION

Figure 1:
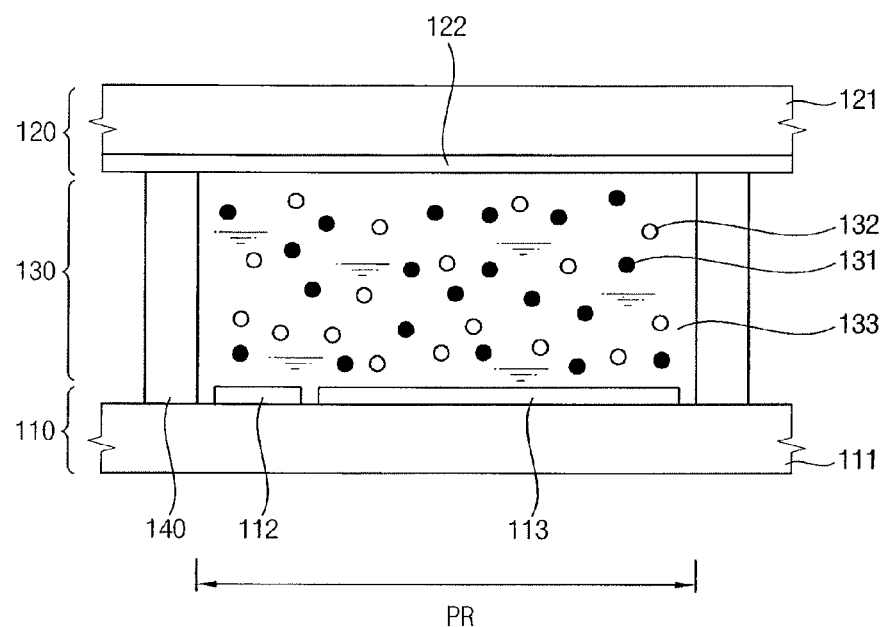
FIG. 1 illustrates a schematic cross-sectional view of an electrophoretic display device in accordance with example embodiments.

The example embodiments are described more fully hereinafter with reference to the accompanying drawings. The inventive concept may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like or similar reference numerals refer to like or similar elements throughout. As used herein, the term "and/or" includes any and all combinations of one or more of the associated listed items.

It will be understood that, although the terms first, second, third etc. may be used herein to describe various elements, components, regions, layers, patterns and/or sections, these elements, components, regions, layers, patterns and/or sections should not be limited by these terms. These terms are only used to distinguish one element, component, region, layer pattern or section from another region, layer, pattern or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative Willis are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross sectional illustrations that are schematic illustrations of illustratively idealized example embodiments (and intermediate structures) of the inventive concept. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a schematic cross-sectional view of an electrophoretic display device in accordance with example embodiments.

Referring to FIG. 1, an electrophoretic display device 100 may include a first display substrate 110, a second display substrate 120, an electrophoretic layer 130, and an isolation wall pattern 140.

The first display substrate 110 and the second display substrate 120 may be spaced apart from each other by a predetermined distance, and may face each other. The electrophoretic layer 130 may be disposed between the first display substrate 110 and the second display substrate 120. The isolation wall pattern 140 may define a pixel region PR where incident light is reflected. For example, the isolation wall pattern 140 may divide the electrophoretic layer 130 into a plurality of pixel regions PR that are arranged in a matrix form. The isolation wall pattern 140 may prevent light incident on a pixel region from entering adjacent pixel regions.

The first display substrate 110 may include a first base substrate 111, a first electrode 112 and a second electrode 113. The first electrode 112 and the second electrode 113 may be formed on the first base substrate 111 in the pixel region PR. The first base substrate 111 may include a transparent insulating material or an opaque insulating material. The first base substrate 111 may include a flexible material. For example, the first base substrate 111 may include a glass substrate, a plastic substrate, a flexible transparent film, or a steel foil, etc.

The first and second electrodes 112 and 113 may be disposed in each pixel region PR. The first and second electrodes 112 and 113 may be spaced apart from each other by a predetermined distance in each pixel region PR. The first and second electrodes 112 and 113 may be electrically separated from each other to operate independently.

The first and second electrodes 112 and 113 may include a transparent conductive material, such as indium tin oxide (ITO) or indium zinc oxide (IZO), etc. Alternatively, the first and second electrodes 112 and 113 may include an opaque conductive material, such as a conductive metal.

The first and second electrodes 112 and 113 may differ in size from each other. Thus, an aperture ratio may be improved when the first and second electrodes 112 and 113 are provided with pixel voltages having different polarities to display a chromatic color. The first electrode 112 may have a size smaller than that of the second electrode 113. For example, the size of the first electrode 112 may be less than about 20% of a size of the pixel region PR, and the size of the second electrode 113 may be greater than about 80% of the size of the pixel region. If the size of the first electrode 112 is too small, particles 131 and 132 may not be exactly electrophoresed. Thus, the size of the first electrode 112 may be from about 5% to about 20% of the size of the pixel region PR. Accordingly, the size of the second electrode 113 may be from about 80% to about 95% of the size of the pixel region PR. Alternatively, the first electrode 112 may have a size substantially the same as that of the second electrode 113. An aperture ratio depending on the sizes of the first and second electrodes 112 and 113 will be described below with reference to FIG. 3C.

The second display substrate 120 may include a second base substrate 121 and a third electrode 122 disposed on the second base substrate 121, e.g., disposed on a lower surface of the second base substrate 121. The second base substrate 121 may face the first base substrate 111. The second substrate 120 has to transmit incident light or reflected light to display an image. As such, the second base substrate 121 may include a transparent insulation material. For example, the second base substrate 121 may include a glass substrate, a plastic substrate or a flexible transparent film, etc.

The third electrode 122 may face the first and second electrodes 112 and 113. The third electrode 122 may be disposed on a surface of the second base substrate 121 facing the first and second electrodes 112 and 113. In some embodiments, the third electrode 122 may be integrally formed on the entire surface of the second base substrate 121 with respect to the plurality of pixel regions PR, e.g., a unitary body extending across the plurality of pixel regions PR. In other example embodiments, the third electrode 122 may have an island structure disposed in each pixel region PR, e.g., the third electrode 122 may include a plurality of third electrodes 122 disposed separately in each pixel region PR may be separate. In a case where the third electrode 122 is separately disposed in each pixel region PR, each third electrode 122 may be provided with a voltage through a separate signal line. As described above, the second substrate 120 has to transmit light to display an image. As such, the third electrode 122 may include a transparent conductive material capable of transmitting light. For example, the third electrode 122 may include indium tin oxide (ITO), indium zinc oxide (IZO), etc.

The electrophoretic layer 130, in which an electric field is formed, may be disposed between the first display substrate 110 and the second display substrate 120. The electrophoretic layer 130 may be disposed between the first electrode 112 and the third electrode 122 and between the second electrode 113 and the third electrode 122. The electrophoretic layer 130 may be divided into the plurality of pixel regions PR by the isolation wall pattern 140. For example, the isolation wall pattern 140 may define the pixel regions PR, i.e., a boundary of the pixel regions, and the electrophoretic layer 130 may include separate portions corresponding to the pixel regions PR.

The electrophoretic layer 130 may include a first charged particle 131, a second charged particle 132, and a chromatic solvent 133. The electrophoretic layer 130 of the pixel region PR may be filled with the chromatic solvent 133. The first and second charged particles 131 and 132 may be dispersed or suspended in the chromatic solvent 133. Each of the first and second charged particles 131 and 132 may be an organic particle or an inorganic particle, and may be charged to have a characteristic of being movable in the electric field by the electrophoresis. The first and second charged particles 131 and 132 may be charged to have different polarities from each other. For example, the first charged particle 131 may have a positive polarity, and the second charged particle 132 may have a negative polarity. Alternatively, the first charged particle 131 may have a negative polarity, and the second charged particle 132 may have a positive polarity. The polarities of the first and second charged particles 131 and 132 are not limited to the above description. The number of the first charged particle 131 and the number of the second charged particle 132 included in the electrophoretic layer 130 of each pixel region PR may be one or more.

The first charged particle 131 may have a black color, and the second charged particle 132 may have a white color. The first and second charged particles 131 and 132 may include a coloring agent for coloring the first and second charged particles 131 and 132 to black and white, respectively. The coloring agent may be a pigment or a dye. For example, the coloring agent may include a pigment, a polymer, a lake-based pigment or a mixture thereof. In an implementation, when the coloring agent includes a black pigment, the coloring agent may include carbon black, copper oxide, manganese dioxide, aniline black, an active carbon, etc. When the coloring agent includes a white pigment, the coloring agent may include titanium oxide, etc.

The colored solvent 133 (chromatic solvent) may be a dispersion medium in which the first and second charged particles 131 and 132 are dispersed or suspended. The colored solvent 133 may have one of predetermined chromatic colors. The colored solvent 133 may include a pigment or a dye to be colored to a chromatic color. The colored solvent 133 may include one of the predetermined chromatic colors so that the electrophoretic display device 100 may display a color image without color filters. If the color filters are used, light-luminance of an electrophoretic display device may be reduced to less than half, compared to an electrophoretic display device not including the color filters. The electrophoretic display device 100 according to example embodiments may use the colored solvent 133 to display the color image, thereby preventing the reduction of the light-luminance. The colored solvent 133 may be one of three colors used in a typical flat panel display device. For example, the colored solvent 133 may include one of a red color, a green color and a blue color. Alternatively, the colored solvent 133 may include one of a cyan color, a magenta color and a yellow color.

Figure 2:
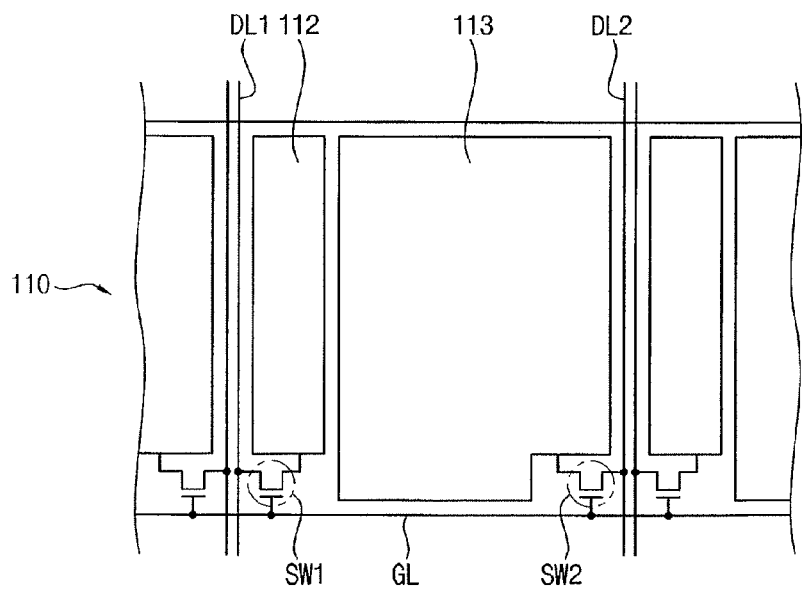
FIG. 2 illustrates a schematic plan view of a first display substrate included in an electrophoretic display device of FIG. 1.

FIG. 2 illustrates a schematic plan view of a first display substrate included in an electrophoretic display device of FIG. 1.

Referring to FIGS. 1 and 2, the first display substrate 110 may further include a plurality of signal lines and a plurality of switching elements for controlling the first and second electrodes 112 and 113.

The signal lines may include a gate line GL, a first data line DL1 and a second data line DL2. The gate line GL may extend in a direction, and each of the first and second data lines DL1 and DL2 may extend in a direction crossing the direction in which the gate line GL extends. For example, the gate line GL may extend in a row direction (or a horizontal direction), and each of the first and second data lines DL1 and DL2 may extend in a column direction (or a vertical direction). The gate line GL may be disposed in a lower portion of the pixel region PR. The first and second data lines DL1 and DL2 may be disposed in parallel with each other, and the first and second electrodes 112 and 113 may be disposed between the first and second data lines DL1 and DL2. The first and second data lines DL1 and DL2 may be disposed in both sides of the pixel region PR, respectively.

The switching elements may include a first switching element SW1 and a second switching element SW2 disposed in each pixel region PR. The first switching element SW1 may be coupled to the gate line GL and the first data line DL1, and may be coupled to the first electrode 112. The first switching element SW1 may provide a pixel voltage to the first electrode 112 through the first data line DL1, in response to a scan signal of the gate line GL. The second switching element SW2 may be coupled to the gate line GL and the second data line DL2, and may be coupled to the second electrode 113. The second switching element SW2 may provide a pixel voltage to the second electrode 113 through the second data line DL2, in response to the scan signal of the gate line GL.

As described above, the first and second electrodes 112 and 113 may be coupled to the first and second data lines DL1 and DL2 via the first and second switching elements SW1 and SW2, respectively, so that the first and second electrodes may be individually controlled. The first display substrate 110 may include a plurality of pixel regions PR arranged in a matrix shape on the first base substrate 111, and the first and second electrodes 112 and 113 may be formed in each pixel region PR. Further, the gate line GL, the first and second data lines DL1 and DL2, and the first and second switching elements SW1 and SW2 may be formed corresponding to each pixel region PA.

The first and second switching elements SW1 and SW2 may include a thin film transistor ("TFT"). For example, the TFTs may be formed as the first and second switching elements SW1 and SW2 on the first base substrate 111, and a protective layer having contact holes may be formed on the TFTs. The first and second electrodes 112 and 113 may be formed on the protective layer, and the first and second electrodes 112 and 113 may make contact with the TFTs through the contact holes. An overcoating layer may be formed on the first and second electrodes 112 and 113. Each TFT may include a gate electrode, a semiconductor layer, and source and drain electrodes. The semiconductor layer may be formed on the gate electrode, and a gate insulation layer may be formed between the gate electrode and the semiconductor layer. The source and drain electrodes may be formed on the semiconductor layer.

As illustrated in FIG. 2, the first and second electrodes 112 and 113 may have a stripe shape, e.g., appear as stripes, when viewed from the top. The first and second electrodes 112 and 113 may be parallel with the first data line DL1 and/or the second data line DL2.

Hereinafter, a method of driving the electrophoretic display device 100 according to displayed colors will be described in detail below with reference to FIGS. 3A to 3C.

Figure 3A:
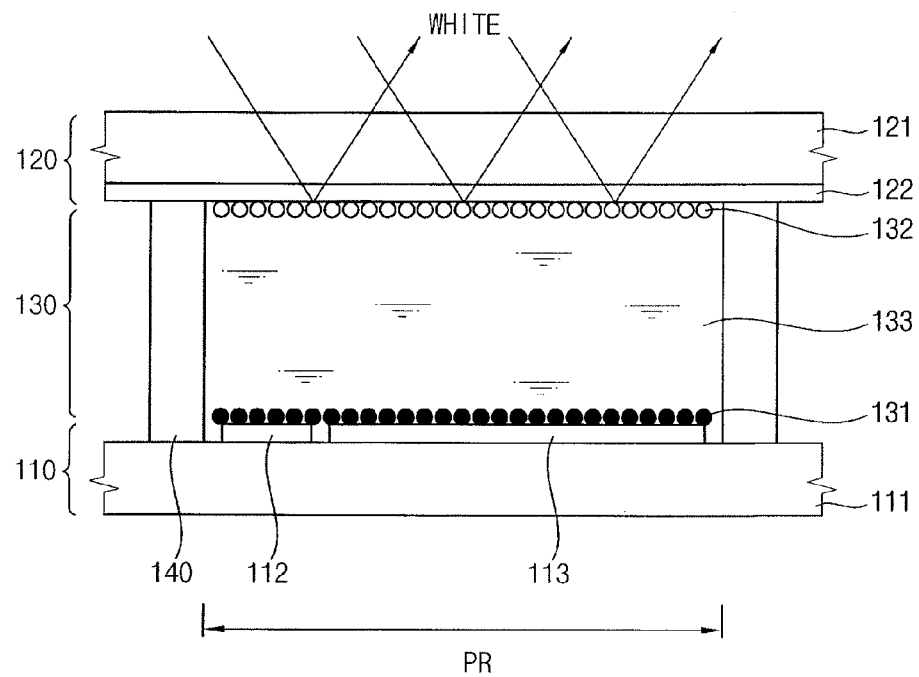
FIGS. 3A to 3C illustrate cross-sectional views of an electrophoretic display device in various stages of a method of driving the electrophoretic display device in accordance with example embodiments.
Figure 3B:
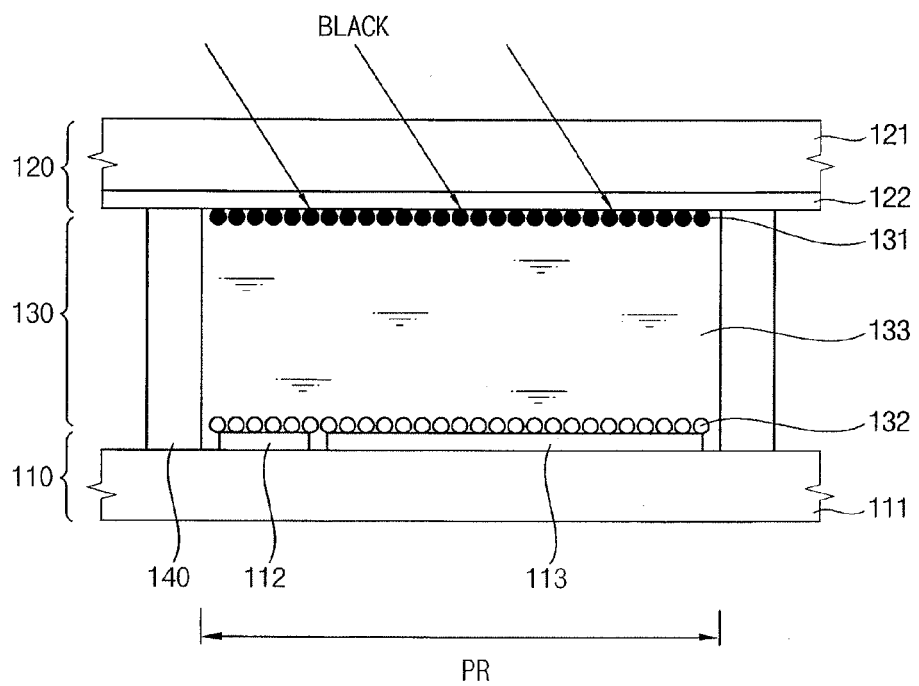
Figure 3C:
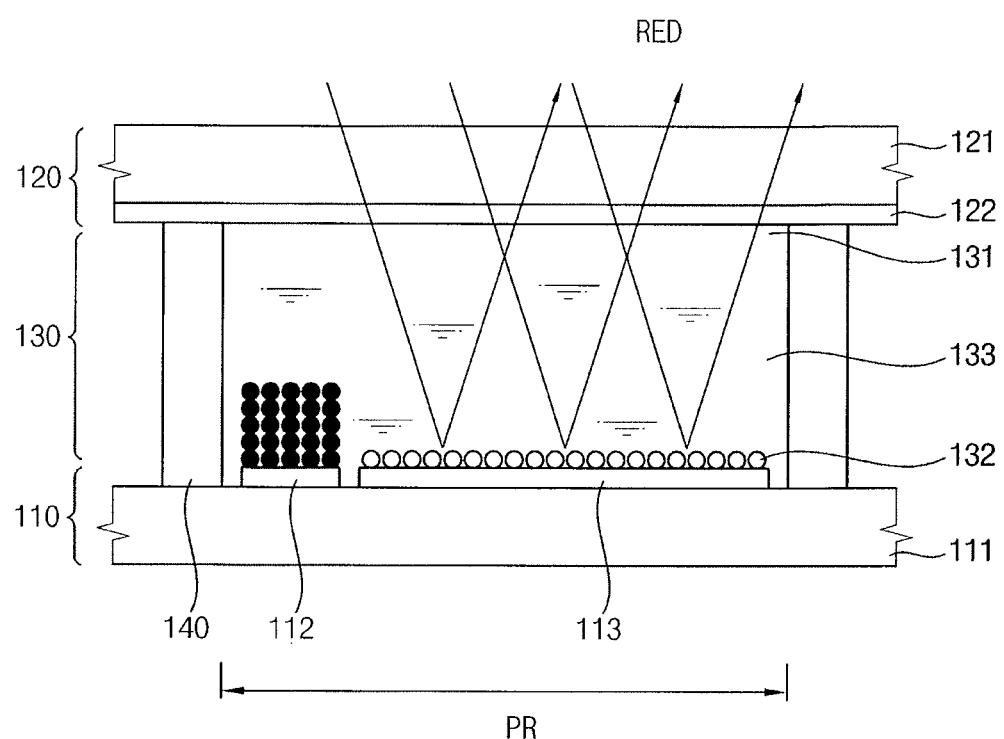

FIGS. 3A to 3C are cross-sectional views of an electrophoretic display device in various stages of a method of driving the electrophoretic display device in accordance with example embodiments.

FIGS. 3A to 3C illustrate an example of a method in which a first charged particle 131, representing a black color, has a positive polarity and a second charged particle 132, representing a white color, has a negative polarity. Here, a "−V" voltage and a "+V" voltage may represent voltages having predetermined voltage levels for electrophoresing the first and second charged particles 131 and 132.

FIG. 3A illustrates a diagram of a stage in a method of driving an electrophoretic display device to display a white color.

Referring to FIGS. 2 and 3A, the −V voltage may be applied to the first and second data lines DL1 and DL2, and the first and second switching elements SW1 and SW2 may be turned on in response to the scan signal of the gate line GL. Accordingly, the −V voltage may be provided to the first and second electrodes 112 and 113, and the first and second electrodes 112 and 113 may be charged to the −V voltage.

The first charged particles 131, having the positive polarity and representing black, may move to the first and second electrodes 112 and 113 such that the first charged particles 131 are converged on the first and second electrodes 112 and 113. The second charged particles 132 having the negative polarity and representing white, may move to the third electrode 122 such that the second charged particles 131 are converged on the third electrode 122.

Thus, light incident from the outside may be reflected by the second charged particles 132 on the third electrode 122. Since the second charged particles 132 represent white, the pixel region PR may display the white color when viewed from the outside. For example, to display the white color, the first charged particles 131, representing black, may move to the first and second electrodes 112 and 113, and the second charged particles 132, representing white, may move to the third electrode 122.

In some example embodiments, to display the white color, the third electrode 122 may be provided with a ground voltage higher than the −V voltage and lower than the +V voltage. In other example embodiments, to display the white color, the third electrode 122 may be provided with the +V voltage. To provide the +V voltage to the third electrode 122, a plurality of the third electrodes 122 may be spaced apart from each other, and each third electrode 122 may be driven independently.

FIG. 3B illustrates a diagram of a stage in a method of driving an electrophoretic display device to display a black color.

Referring to FIGS. 2 and 3B, the +V voltage may be applied to the first and second data lines DL1 and DL2, and the first and second switching elements SW1 and SW2 may be turned on in response to the gate line GL. Accordingly, the +V voltage may be provided to the first and second electrodes 112 and 113, and the first and second electrodes 112 and 113 may be charged to the +V voltage.

The second charged particles 132 having the negative polarity, which represent white, may move to the first and second electrodes 112 and 113 such that the second charged particles 132 are converged on the first and second electrodes 112 and 113. The first charged particles 131 having the positive polarity, which represent black, may move to the third electrode 122 such that the first charged particles 131 are converged on the third electrode 122.

Thus, light incident from the outside may be reflected by the first charged particles 131 on the third electrode 122. Since the first charged particles 131 represent black, the pixel region PR may display the black color when viewed from the outside. That is, to display the black color, the second charged particles 132 representing white may move to the first and second electrodes 112 and 113, and the first charged particles 131 representing black may move to the third electrode 122.

In some example embodiments, to display the black color, the third electrode 122 may be provided with a ground voltage higher than the −V voltage and lower than the +V voltage. In other example embodiments, to display the black color, the third electrode 122 may be provided with the −V. To provide the −V voltage to the third electrode 122, a plurality of the third electrodes 122 may be spaced apart from each other, and each third electrode 122 may be driven independently.

FIG. 3C illustrates a diagram of a stage in a method of driving an electrophoretic display device to display a chromatic color.

Referring to FIGS. 2 and 3C, the −V voltage may be applied to the first data line DL1, and the +V voltage may be applied to the second data line DL2. The first and second switching elements SW1 and SW2 may be turned on in response to the scan signal of the gate line GL. Accordingly, the −V voltage may be provided to the first electrode 112, and the +V voltage may be provided to the second electrode 113. The first electrode 112 may be charged to the −V voltage, and the second electrode 113 may be charged to the +V voltage. For example, the voltages having different polarities may be provided to the first and second electrodes 112 and 113 to display the chromatic color.

The first charged particles 131 having the positive polarity may move to the first electrode 112 charged to the −V voltage such that the first charged particles 131 are converged on the first electrode 112. The second charged particles 132 having the negative polarity may move to the second electrode 113 charged to the +V voltage such that the second charged particles 132 are converged on the second electrode 113. Since the first and second charged particles 131 and 132 may move to the first and second electrode 112 and 113, respectively, no particle may exist on the third electrode 122.

Thus, light incident from the outside, may penetrate the second display substrate 120, and may reach the first display substrate 110. The light reaching the first display substrate 110 may be reflected by the second charged particles 132 on the second electrode 113, and may be emitted to the outside. Since the light reflected by the second charged particles 132 may pass through the colored solvent 133, the emitted light may represent the chromatic color of the colored solvent 133. Thus, the pixel region PR may display the chromatic color of the colored solvent 133. For example, in a case where the colored solvent 133 has a red color, the pixel region PR may display the red color to the outside. In an implementation, to represent the chromatic color, the first and second charged particles 131 representing black and white may move to the first and second electrode 112 and 113, and the colored solvent 133 may have the chromatic color.

The third electrode 122 may be provided with a ground voltage higher than the −V voltage and lower than the +V voltage.

The chromatic color may be displayed by the light reflected from the second charged particles 132. As such, light-luminance may be determined according to the intensity of the light reflected from the second charged particles 132. The intensity of the light reflected from the second charged particles 132 may increase as a ratio of the size of the second electrode 113 to the size of the pixel region PR. The ratio of the size of the second electrode 113 to the size of the pixel region PR may be referred to as an aperture ratio. Thus, to increase the aperture ratio and the light-luminance, the second electrode 113 may have a larger size than that of the first electrode 112. For example, the first electrode 112 may have a size that is less than about 20% of the size of the pixel region PR, and the second electrode 113 may have a size that is greater than about 80% of the size of the pixel region PR.

The first charged particles 131, having the black color on the first electrode 112, may prevent the light incident on the pixel region PR from entering adjacent pixel regions. The first electrode 112, on which the first charged particles 131 are converged, may serve as a light blocking region. As such, color mixing between adjacent pixel regions may be prevented, and the quality of image may be improved.

In an electrophoretic display device using color filters, light may be lost while passing through the color filters. The intensity of light passing through the color filters may be reduced to less than half of the intensity of initial incident light. However, the electrophoretic display device 100 according to the example embodiments may not include the color filters, thereby preventing the reduction of the incident light, or the light-luminance. Thus, the electrophoretic display device 100 according to the example embodiments may display the white color, the black color and the chromatic color having high contrast ratio and high light-luminance without the color filters.

In some example embodiments, when the electrophoretic display device 100 displays the chromatic color in the pixel region PR, the electrophoretic display device 100 may display the black color or the white color in an adjacent pixel region, thereby displaying a vivid chromatic color.

Figure 4B:
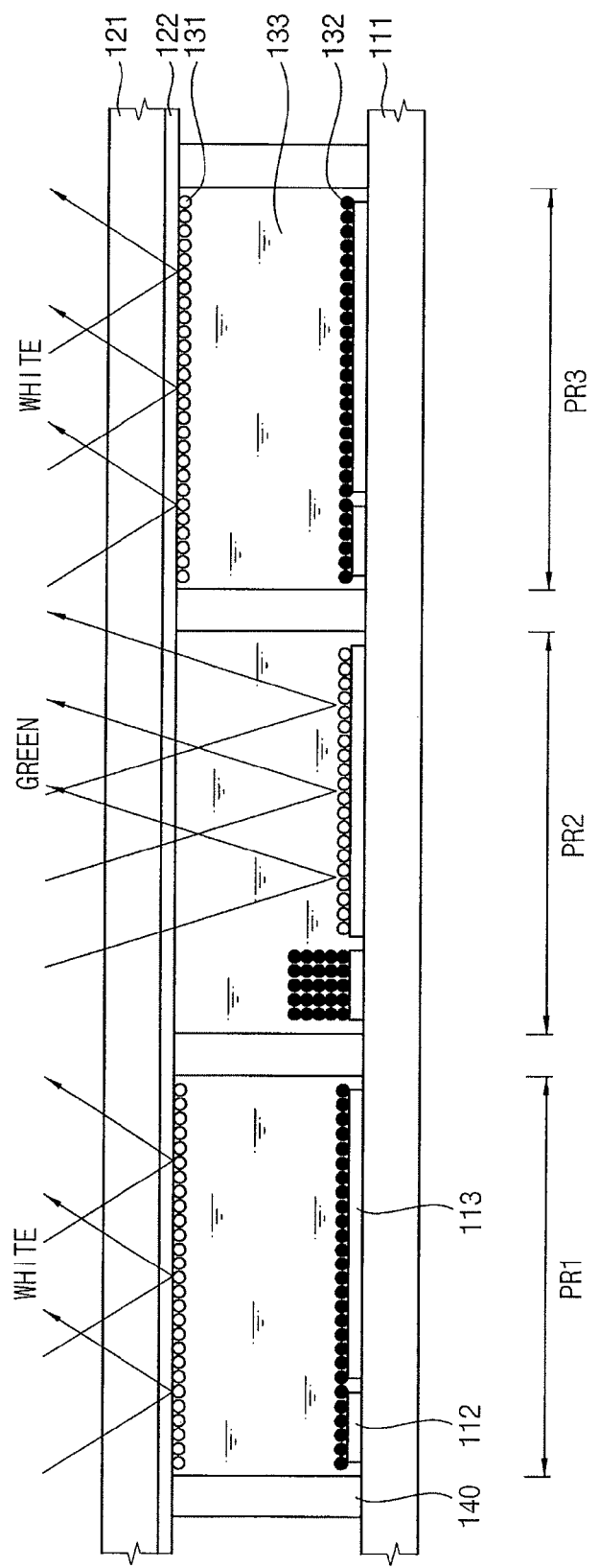

FIGS. 4A and 4B are cross-sectional views of an electrophoretic display device in various stages of a method of driving the electrophoretic display device to display a color image in accordance with example embodiments.

FIGS. 4A and 4B illustrate examples of three pixel regions for displaying a red color, a green color and a blue color, respectively. The three pixel regions may include the colored solvents 133 representing red, green and blue, respectively. Hereinafter, the pixel region displaying the red color may be referred to as a "first pixel region PR1", the pixel region displaying the green color may be referred to as a "second pixel region PR2", and the pixel region displaying the blue color may be referred to as a "third pixel region PR3".

Referring to FIG. 4A, when the second pixel region PR2 displays the green color, the adjacent first and third pixel regions PR1 and PR3 may display a black color. Accordingly, the green color displayed by the second pixel region PR2 may become more vivid.

For example, a first electrode 112 of the second pixel region PR2 may be charged to a −V voltage, and a second electrode 113 of the second pixel region PR2 may be charged to a +V voltage. Thus, in the second pixel region PR2, the first charged particles 131 having a positive polarity may move to the first electrode 112, such that the first charged particles 131 are converged on the first electrode 112, and the second charged particles 132 having a negative polarity may move to the second electrode 113, such that the second charged particles 132 are converged on the second electrode 113. Since the color solvent 133 of the second pixel region PR2 has the green color, the second pixel region PR2 may display the green color. First and second electrodes 112 and 113 of the first pixel region PR1 may be charged to the +V voltage, and first and second electrodes 112 and 113 of the third pixel region PR3 may be charged to the +V voltage. Accordingly, in the first and third pixel regions PR1 and PR3, the second charged particles 132 representing white may be converged on the first and second electrodes 112 and 113, and the first charged particles 131 representing black may be converged on a third electrode 122. The first and third pixel regions PR1 and PR3 may, thereby, display the black color. The green color displayed by the second pixel region PR2 may become more vivid by the black color display by the adjacent first and third pixel regions PR1 and PR3.

Referring to FIG. 4B, when the second pixel region PR2 displays the green color, the adjacent first and third pixel regions PR1 and PR3 may display a white color. Accordingly, the green color displayed by the second pixel region PR2 may become more vivid.

For example, in the second pixel region PR2, the first charged particles 131 may be electrophoresed to the first electrode 112, and the second charged particles 132 may be electrophoresed to the second electrode 113. Thus, the second pixel region PR2 may display the green color. In the first and third pixel regions PR1 and PR3, the first charged particle 131 may be electrophoresed to the first and second electrodes 112 and 113, and the second charged particles 132 having the white color may be electrophoresed to the third electrode 122. The first and third pixel regions PR1 and PR3 may, thereby, display the white color. The green color displayed by the second pixel region PR2 may become more vivid by the white color displayed by the adjacent first and third pixel regions PR1 and PR3.

By way of summation and review, an EPD device may use a color filter to display the color image. When the color filter is used, since incident light passes through the color filter twice, luminance of reflected light may be reduced to about half that of the incident light, and the contrast and the quality of the image may be deteriorated due to the reduction of the luminance.

In contrast, an electrophoretic display device 100 according to example embodiments may display a chromatic color without color filters using a horizontal electric field and a colored solvent, thereby improving contrast ratio and light-luminance of the chromatic color. Further, the electrophoretic display device 100 according to example embodiments may display a black color and a white color using a vertical electric field and charged particles having the black color and the white color. In addition, when the chromatic color is displayed in a pixel region, the electrophoretic display device 100 according to example embodiments may display the black color and/or the white color in adjacent pixel regions, thereby further improving the visibility of the chromatic color. Accordingly, example embodiments may provide electrophoretic display devices displaying color images with high contrast and high luminance. Example embodiments may provide methods of driving electrophoretic display devices to display color images with high contrast and high luminance.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. An electrophoretic display device, comprising:
   a first display substrate including a base substrate and at least three pixel regions, each of the pixel regions including a first electrode and a second electrode, the first electrode and the second electrode being on the base substrate; and
   a second display substrate facing the first and second electrodes and including at least one third electrode opposing the first and second electrodes in each of the pixel regions, wherein:
   each of the pixel regions further includes an electrophoretic layer between the first display substrate and the second display substrate, the electrophoretic layer including a plurality of first charged particles, a plurality of second charged particles, and a colored solvent, the first and second charged particles having different polarities from each other, and the colored solvent having a chromatic color,
   each of the pixel regions is configured to display a black color or a white color using a vertical electric field between the third electrode and the first and second electrodes, and is configured to display a chromatic color using a horizontal electric field between the first electrode and the second electrode,
   a second pixel region is between adjacent first and third pixel regions, and
   the second pixel region is to display a chromatic color at a time when the first and third pixel regions are to display a same one of the black color or the white color.

2. The electrophoretic display device of claim 1, further comprising: an isolation wall pattern disposed between the first display substrate and the second display substrate in each of the pixel regions, the isolation wall pattern defining a boundary of the pixel region.

3. The electrophoretic display device of claim 2, wherein the electrophoretic layer of each of the pixel regions is filled with a solvent of a different color.

4. The electrophoretic display device of claim 2, wherein a distance between two adjacent isolation wall patterns along the first display substrate equals a distance between the two isolation wall patterns along the second display substrate in each of the pixel regions, an area defined by the two isolation wall patterns on the second display substrate overlaps the entire first and second electrodes.

5. The electrophoretic display device of claim 1, wherein the first charged particle has a black color, and the second charged particle has a white color.

6. The electrophoretic display device of claim 1, wherein a size of the first electrode is smaller than a size of the second electrode.

7. The electrophoretic display device of claim 6, wherein the size of the first electrode is less than about 20% of a size of the pixel region.

8. The electrophoretic display device of claim 6, wherein the first, second, and third electrodes in each of the pixel regions are configured to be applied with different voltages, such that first and second particles are arranged on respective first and second electrodes to reflect light only from the second particles on the second electrode.

9. The electrophoretic display device of claim 1, wherein the colored solvent of the electrophoretic layer has one of a red color, a green color and a blue color.

10. The electrophoretic display device of claim 1, wherein the colored solvent of the electrophoretic layer has one of a cyan color, a magenta color and a yellow color.

11. The electrophoretic display device of claim 1, wherein the colored solvent of the electrophoretic layer includes a dye or a pigment.

12. The electrophoretic display device of claim 1, wherein the first display substrate further comprises:
   a gate line extending in a first direction;
   first and second data lines extending in a second direction intersecting the first direction, the first and second data lines disposed in parallel, and the first and second electrodes disposed between the first data line and the second data line;
   a first switching element coupled to the gate line and the first data line, and configured to apply a pixel voltage on the first data line to the first electrode in response to a scan signal of the gate line; and
   a second switching element coupled to the gate line and the second data line, and configured to apply a pixel voltage on the second data line to the second electrode, in response to the scan signal of the gate line.

13. The electrophoretic display device of claim 1, wherein the first, second, and third electrodes are configured to adjust the electric field in the electrophoretic layer in each of the pixel regions, such that the first and second particles are arranged on different ones of the first and second electrodes when displaying a color of the colored solvent.

14. The electrophoretic display device of claim 1, wherein the third electrode is a common electrode which extends into each of the pixel regions.

15. The electrophoretic display device of claim 1, wherein:
in each of the pixel regions the first electrode has a first length and the second electrode has a second length at least two times greater than the first length, and
in the second pixel region, the horizontal electric field is of sufficient strength to cause the first charged particles to accumulate to a first height on the first electrode and the second charged particles to accumulate to a second height on the second electrode when a reference voltage is applied to the third electrode, the first height being three or more times greater than the second height, the first charged particles at the first height forming a light blocking region in the second pixel region relative to an adjacent one of the first or second pixel regions.

16. A method of driving an electrophoretic display device, the method comprising:
displaying a white color of a second charged particle by electrophoresing a first charged particle having a black color to first and second electrodes and the second charged particle having the white color to a third electrode facing the first and second electrodes, the first and second charged particles dispersed in a colored solvent having a chromatic color, and the first and second charged particles having different polarities from each other;
displaying the black color of the first charged particle by electrophoresing the first charged particle to the third electrode and the second charged particle to the first and second electrodes; and
displaying the chromatic color of the colored solvent by electrophoresing the first charged particle to the first electrode and the second charged particle to the second electrode, such that light is reflected from the second particles on the second electrode directly to the outside to represent a color of the colored solvent, wherein displaying the chromatic color of the colored solvent includes electrophoresing the first particles having the black color to the first electrode and the second particles having the white color to the second electrode, such that the first particles on the first electrode define a light blocking region.

17. The method of claim 16, wherein a size of the first electrode is smaller than a size of the second electrode.

18. The method of claim 17, wherein the size of the first electrode is less than about 20% of a size of the pixel region.

19. The method of claim 17, wherein displaying the chromatic color of the colored solvent includes adjusting voltages of the first and second electrodes to have different polarities, such that second particles on the second electrode overlap at least 80% of a pixel region when reflecting light.

20. The method of claim 16, wherein displaying the chromatic color of the colored solvent includes electrophoresing all of the particles in the colored solvent to the first and second electrodes, such that there are no suspended particles in the colored solution.

21. An electrophoretic display device, comprising:
a first substrate having a plurality of pixel regions, each pixel region including a first electrode and a second electrode; and
a second substrate spaced from the first substrate and including at least one third electrode opposing the first and second electrodes in each pixel region, wherein:
each pixel region includes an electrophoretic layer between the first and second substrates, the electrophoretic layer including a plurality of first charged particles and a plurality of second charged particles, the first and second charged particles having different polarities,
the first electrode has a first length and the second electrode has a second length at least two times greater than the first length in each pixel region, and
the first charged particles are to accumulate to a first height on the first electrode and the second charged particles are to accumulate to a second height on the second electrode when different voltages are applied to the first, second, and third electrodes in one of the three pixel regions, the first height being three or more times greater than the second height and at least substantially equal to one third of a distance between the first and second substrates, the first charged particles at the first height forming a light blocking region relative to an adjacent pixel region.

* * * * *